(12) United States Patent
Varney et al.

(10) Patent No.: US 7,212,506 B2
(45) Date of Patent: May 1, 2007

(54) SYSTEM FOR THE SECURE DISTRIBUTION OF PRIORITY CALL ACCESS CODES TO PROVIDE GUARANTEED WIRELESS COMMUNICATION SERVICE TO PRIORITY WIRELESS COMMUNICATION SUBSCRIBERS

(75) Inventors: Douglas William Varney, Naperville, IL (US); Chinmei Chen Lee, Woodridge, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 1039 days.

(21) Appl. No.: 10/299,401

(22) Filed: Nov. 18, 2002

(65) Prior Publication Data

US 2004/0095954 A1 May 20, 2004

(51) Int. Cl.
*H04Q 7/00* (2006.01)
(52) U.S. Cl. .................. 370/329; 455/404.1
(58) Field of Classification Search ............. 370/328, 370/310, 329, 341; 455/403, 404.1, 404.2, 455/521, 422.1, 450
See application file for complete search history.

(56) References Cited

U.S. PATENT DOCUMENTS

| | | | | |
|---|---|---|---|---|
| 5,862,485 A | * | 1/1999 | Linneweh et al. | ........... 455/450 |
| 6,208,728 B1 | * | 3/2001 | Airaksinen | ............. 379/215.01 |
| 2001/0009858 A1 | * | 7/2001 | Veerasamy | .................. 455/512 |
| 2001/0051514 A1 | * | 12/2001 | Lindholm | .................... 455/404 |
| 2002/0101979 A1 | * | 8/2002 | Borodow et al. | ....... 379/265.02 |

* cited by examiner

*Primary Examiner*—Ajit Patel

(57) ABSTRACT

The priority communication system provides the capability to restrict access to wireless communications services to emergency service personnel, such that their access to wireless communication services is not interruptible. This is accomplished by provisioning the cell sites of a wireless communications system to respond to at least one service priority grouping, with emergency service personnel being assigned a selected service priority by a centralized emergency services agency. The service priority coverage area and emergency service personnel assigned the service priority are defined on a dynamic basis by the centralized emergency services agency and are indicated by a priority call access code that is transmitted to the emergency service personnel. In order to ensure the proper operation of the priority communication system, the priority call access codes are maintained in secrecy to thereby enable emergency service personnel to have access to wireless communications facilities.

16 Claims, 5 Drawing Sheets

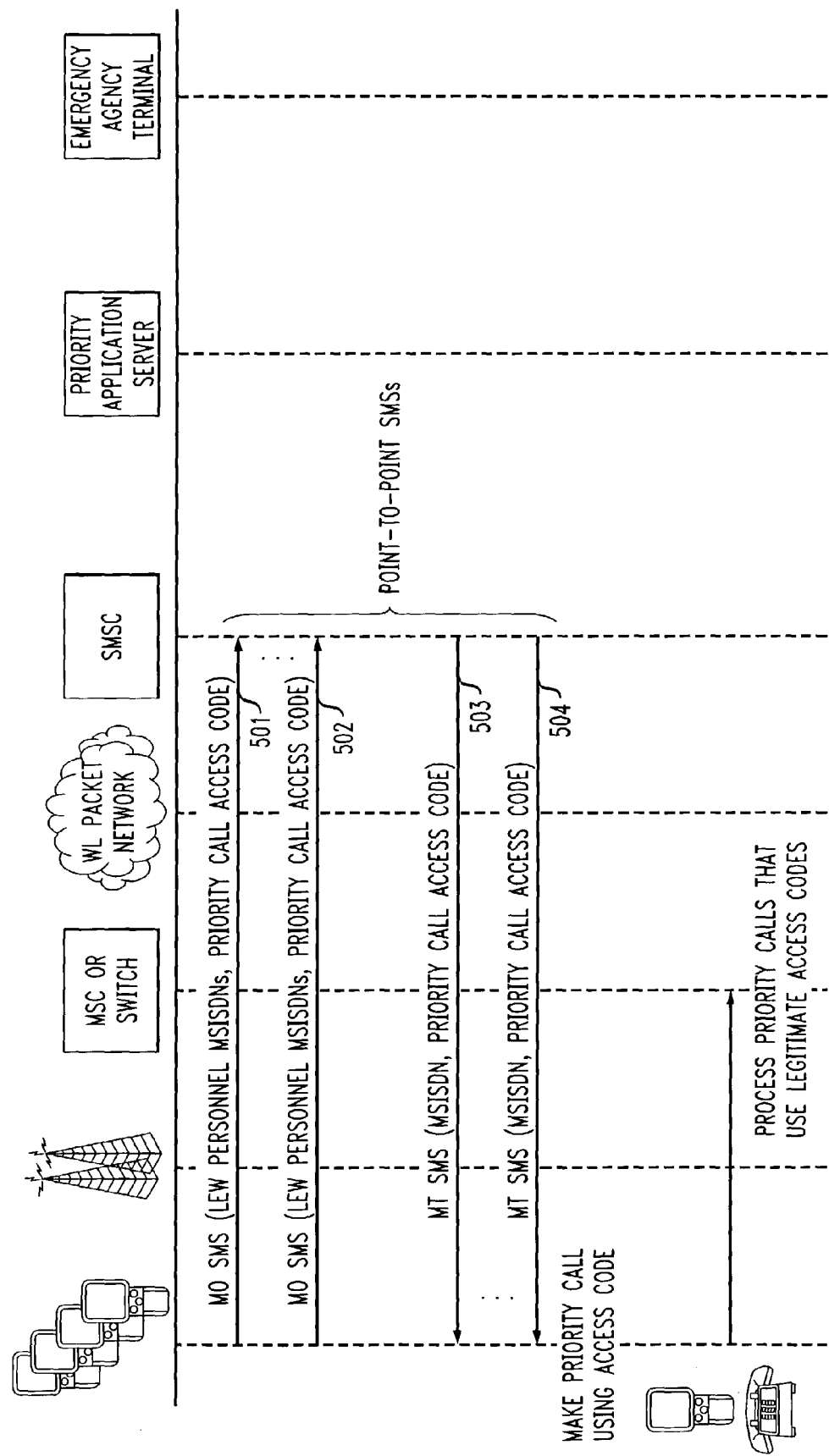

SYSTEM FOR THE SECURE DISTRIBUTION OF PRIORITY CALL ACCESS CODES TO PROVIDE GUARANTEED WIRELESS COMMUNICATION SERVICE TO PRIORITY WIRELESS COMMUNICATION SUBSCRIBERS

CROSS-REFERENCE TO RELATED APPLICATIONS

This application is related to U.S. patent application Ser. No. 09/293,586 titled "System For Providing Guaranteed Wireless Communication Service To Priority Wireless Communication Subscribers".

FIELD OF THE INVENTION

This invention relates to wireless communications systems and, in particular, to a system for providing priority subscribers, such as emergency service personnel and non-emergency customers willing to pay, with guaranteed access to wireless communication services.

PROBLEM

It is a problem in the field of wireless communication systems to appropriately allocate cell site and network resources to serve the demand for wireless communications services in emergency situations, where a multitude of wireless communications subscribers all vie for limited available wireless resources. An example of this situation is in the instance on a natural disaster, such as a severe weather conditions, where the land lines are down or otherwise inaccessible or unavailable and the only communication service available to the subscriber is wireless communications. In this instance, wireless subscribers' service requests can cause a temporary overload in the wireless communication system. The emergency service personnel operational in the affected area have to compete for wireless communication service on an equal basis with the other wireless communication subscribers. The emergency service personnel can therefore be blocked from call origination within a cell or their existing wireless calls can be interrupted in a call handoff or as they traverse multiple cells. The interruption of an emergency call or the inability to place an emergency call is an unacceptable service condition, yet a reality in existing wireless communication systems. While the example of a natural disaster is mentioned, there are numerous other exceptional events that can cause the same effect on the wireless communication systems. Such events include but are not limited to: aircraft crashes, railroad accidents, acts of terrorism, public disturbances, and the like.

Thus, existing wireless communication systems treat vital communications with the same priority as non-essential wireless communications, since there is presently no capability in such systems to differentiate among wireless subscribers and/or call destinations.

SOLUTION

The above-described problems are solved and a technical advance achieved in the field by the present system for the secure distribution of priority call access codes to priority wireless communication subscribers (termed "priority communication system" herein), which priority call access codes are used to provide guaranteed wireless communication service. This priority communication system provides the capability to restrict access to wireless communications services to a selected set of subscribers, such as law enforcement personnel and emergency workers (termed "emergency service personnel" herein), such that their access to wireless communication services is not interruptible. This is accomplished by provisioning the cell sites of a wireless communications system to respond to at least one service priority grouping, with emergency service personnel being assigned a selected service priority by a centralized emergency services agency. The service priority coverage area and emergency service personnel assigned the service priority are defined on a dynamic basis by the centralized emergency services agency and are indicated by a priority call access code that is transmitted to the emergency service personnel. The wireless service provider also receives this data so that the cell sites in the service priority coverage area can then differentially provide wireless communication services to the emergency service personnel, based upon the service priority assigned to a particular group of emergency service personnel.

In order to ensure the proper operation of the priority communication system, the priority call access codes are maintained in secrecy to thereby enable emergency service personnel to have access to wireless communications facilities. The priority call access codes are typically localized, with a set of priority call access codes being assigned to a particular coverage area, so if a priority call access code is compromised, other priority call access codes remain effective. The emergency service personnel are typically equipped with Short Message Service (SMS) enabled wireless phones. A centralized emergency services agency typically uses a code name that is communicated to emergency service personnel to designate a crisis response. The emergency service personnel access to the repository of code names can be implemented via a secure URL that directs the emergency services personnel to a priority application server that is maintained by the centralized emergency services agency. Secure passwords are used to ensure authorized access and the mapping of a particular location to a priority access code is maintained on a database associated with the priority application server.

The extent of the operation of this priority communication system is controllable on a granularity selected by the wireless service provider and/or the centralized emergency services agency, in that the priority communication system can be activated on a cell site basis, cell sector or cell face basis, such that the wireless communication service coverage area corresponds to the traffic impacted area. In addition, the operation of the present priority communication system is independent of the wireless communication technology used to provide wireless communication services and in fact can be provisioned to span multiple wireless communication technologies.

BRIEF DESCRIPTION OF THE DRAWING

FIGS. 2–5 illustrate in flow diagram form the operation of the present priority communication system.

DETAILED DESCRIPTION

Cellular mobile telecommunication systems represent one example of wireless communications systems and function to provide the service of connecting mobile telecommunications customers, each having a mobile subscriber unit, to both land-based customers who are served by the common carrier public telephone network as well as other mobile telecommunications customers.

Cellular Communication Network Philosophy

Figure 1:
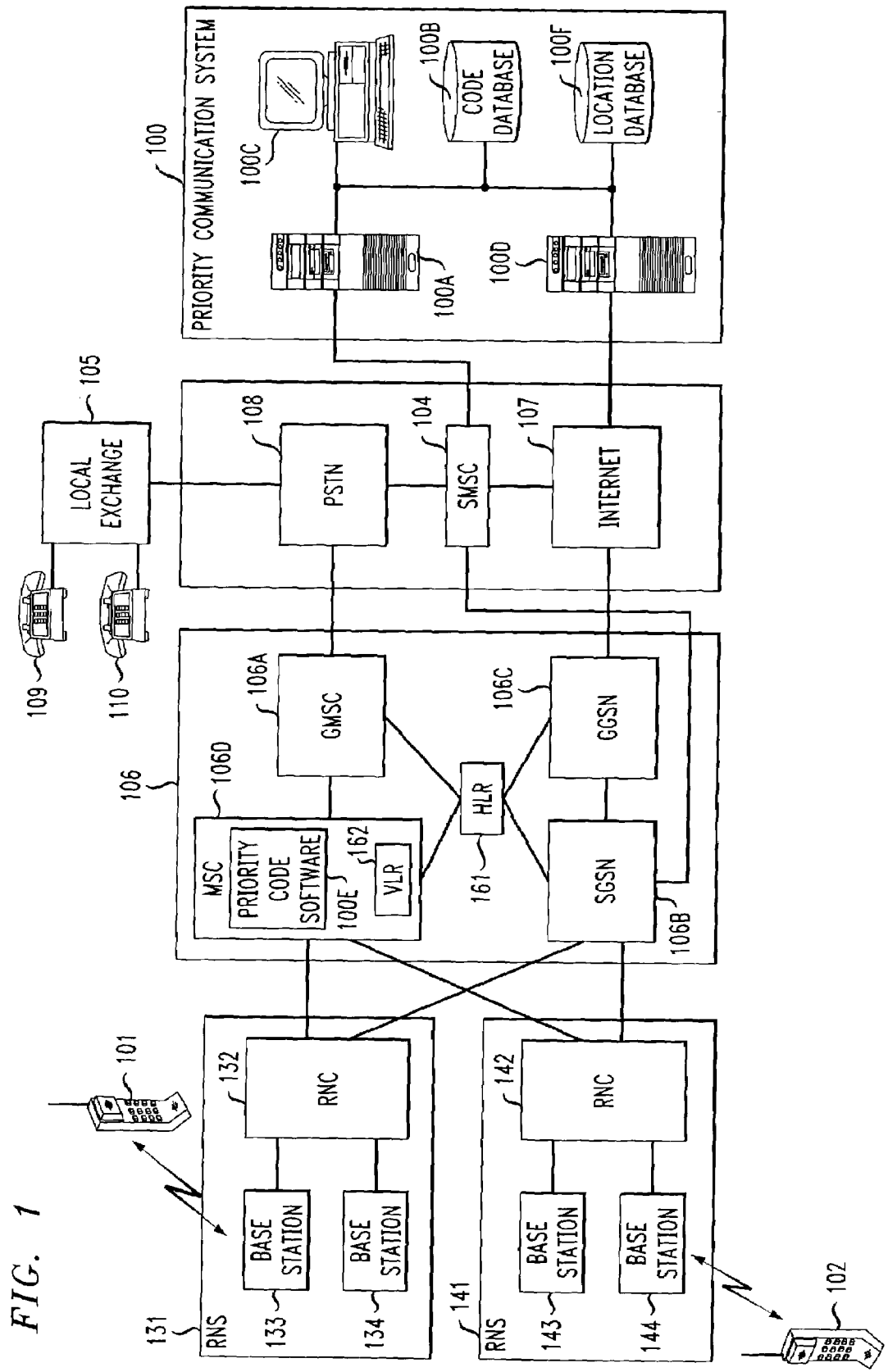
FIG. 1 is the block diagram of the architecture of the present priority communication system and one example of an existing commercial wireless communications system in which it is implemented.

FIG. 1 is the block diagram of the architecture of the present priority communication system and one example of an existing commercial wireless communications system in which it is implemented, such as a GSM cellular system, for example. Cellular communication networks provide the service of connecting wireless telecommunication customers, each having a wireless subscriber device 101, 102, to both land-based customers 109, 110 who are served by a local exchange 105 in the common Carrier Public Switched Telephone Network (PSTN) 108 as well as other wireless telecommunication customers. In such a network, all incoming and outgoing calls are routed through Mobile Switching Centers (MSC) 106D, each of which is connected to a plurality of Radio Network Subsystems (RNS) 131–141 which communicate with wireless subscriber devices 101, 102 located in the area covered by the cell sites. The wireless subscriber devices 101, 102 are served by the Radio Network Subsystems (RNS) 131–141, each of which is located in one cell area of a larger service region. Each cell site in the service region is connected by a group of communication links to the Mobile Switching Center 106D. Each cell site contains a group of radio transmitters and receivers, termed a "Base Station" herein, with each transmitter-receiver pair being connected to one communication link. The Mobile Switching Center 106D, in conjunction with the Home Location Register (HLR) 161 and the Visitor Location Register (VLR) 162, manages subscriber registration, subscriber authentication, and the provision of wireless services such as voice mail, call forwarding, roaming validation and so on. The Mobile Switching Center 106D is connected to a Gateway Mobile Services Switching Center (GMSC) 106A as well as to the Radio Network Controllers, with the GMSC 106A serving to interconnect the Mobile Switching Center 106D with the PSTN/IP Network 108. In addition, the Radio Network Controllers are connected via Serving GPRS Support Node 106C and thence the Gateway GPRS Support Node GGSN 106B to the Internet. The Radio Network Controllers 132, 142 at each cell site Radio Network Subsystem 131–141 control the transmitter-receiver pairs at the Radio Network Subsystem 131–141. In the case of WCDMA, the system also selects the PN code word to enhance isolation of the communications with the wireless subscriber devices.

The WCDMA platform operates as a Code Division Multiple Access wireless network in a Wideband format (the "W" in WCDMA) and is designed to carry a wireless call between a wireless subscriber device and a Base Station, by simultaneously using multiple Base Stations or antennas to mitigate the effects of signal fading of various types. The control channels that are available in this system are used to setup the communication connections between the subscriber stations 101 and the Base Station 133. When a call is initiated, the control channel is used to communicate between the wireless subscriber device 101 involved in the call and the local serving Base Station 133. The control messages locate and identify the wireless subscriber device 101, determine the dialed number, and identify an available voice/data communication channel consisting of a pair of radio frequencies and orthogonal coding which is selected by the Base Station 133 for the communication connection. The radio unit in the wireless subscriber device 101 re-tunes the transmitter-receiver equipment contained therein to use these designated radio frequencies and orthogonal coding.

The voice communications between wireless subscriber device 101 and other subscriber stations, such as land line based subscriber station 109, is effected by routing the communications received from the wireless subscriber device 101 through the Mobile Switching Center 106D and trunks to the Public Switched Telephone Network (PSTN) 108 where the communications are routed to a Local Exchange Carrier 105 that serves land line based subscriber station 109. There are numerous Mobile Switching Centers 106D that are connected to the Public Switched Telephone Network (PSTN) 108 to thereby enable subscribers at both land line based subscriber stations and wireless subscriber devices to communicate between selected stations thereof. This architecture represents the present architecture of the wireless and wireline communication networks. The present priority communication system 100 is shown connected to the Mobile Switching Centers 106D via the Public Switched Telephone Network 108 as well as a data communication network such as the Internet 107, although these examples of interconnections are subject to an implementation selected by the purveyor of communique services and some of these connections can be eliminated as unnecessary for some implementations as described below.

Wideband Code Division Multiple Access

The Wideband Code Division Multiple Access (WCDMA) platform operates as a Code Division Multiple Access wireless network in a Wideband format (the "W" in WCDMA). The RF carriers are 4.4 to 5.0 MHz wide in the spectral domain with each RF carrier supporting multiple simultaneous "channels" subdivided in the code domain. The data streams are spread using code words which enables processing gain at the receiver thereby improving the quality of reception both in terms of BLER/BER (Block Error Rate and Bit Error Rate) and overall improvement in signal levels with respect to noise and interference (Ec/Io). The receiver accomplishes this "process gain" through the use of up to eight (formerly four with IS-95) Rake receivers, all operating on different code words on the same frequency of reception. WCDMA, like the CDMA2000 family and IS-95, uses Dynamic Power Control (DPC) to manage self-interference generated by users communicating on the same frequency. WCDMA has both forward and reverse path fast Dynamic Power Control at 1500 Hz (while IS-95 is at 800 Hz in the reverse path only).

Handovers, or handoffs, are managed by network equipment directly connected to the Base Stations. In WCDMA, this equipment is called a Radio Network Controller (RNC) versus a Base Station Controller (BSC) in IS-95. Despite the name change, the devices perform similar functions. The 5 MHz carrier creates an environment for improved multi-path fading resistance due to the broadband nature of the carrier. Selective frequency fades at any given frequency or narrowband of frequencies do not occur at the same time and the matched filter reception processor does not "see" these deep frequency selective fades. Unlike the CDMA2000 family, the transmissions in WCDMA, while circuit switched in nature, are packetized into 10 millisecond frames for the over-the-air interface. These frames contain multiple, simultaneous code-divided channels called Dedicated Channels (DCHs) and associated network signaling control channels such as Forward Access Channel (FACH), Reverse Access Channel (RACH) and so on. The Dedicated Channel is the primary bearer of traffic or content to/from the wireless subscriber device 101 to the Base Station 133.

Within each frame, the bit rate is variable for any given user channel and is managed by the network to optimize delivery of traffic/content in a spectrally efficient manner. So, for example, Dedicated Channel One on Frame One may have a low bit rate (relative) but on Frame Two, Dedicated Channel One may change to a high bit rate (again relative). This process is done for each frame, on a frame-by-frame basis and incorporates the traffic profile of each code divided channel. In addition, the network manages the addition and deletion of channels as traffic is added or terminated (again, in the code domain). In addition to managing the bit rates per code divided channel on a 10 millisecond time domain basis, the code word spreading on a Dedicated Channel basis is variable based on the class of service being offered.

The operation of the present system for providing guaranteed wireless communication service to priority wireless communication subscribers is independent of the wireless communication technology used to provide wireless communication services and in fact can be provisioned to span multiple wireless communication technologies. The example used herein describes a CDMA wireless communication system and with CDMA systems, a plurality of transmitter-receiver pairs share a common frequency pair. This is made possible by the orthogonal coding that is inherent with CDMA. There may be implementations where the hardware that hosts functionalities for voice and for data is one and the same. In general, voice and data functionalities in the network beyond base stations are handled in separate network elements from the communication link to an incoming or outgoing trunk. The mobile communication system is controlled by a mobile telecommunication controller, Mobile Switching Center 106D for voice, and SGSN 106B for UMTS data at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the assignment of transmitter-receiver pairs at the base station. The control processes at each base station also control the tuning of the mobile subscriber units to the selected radio frequency.

Operation of the Priority Communication System

Figure 2:
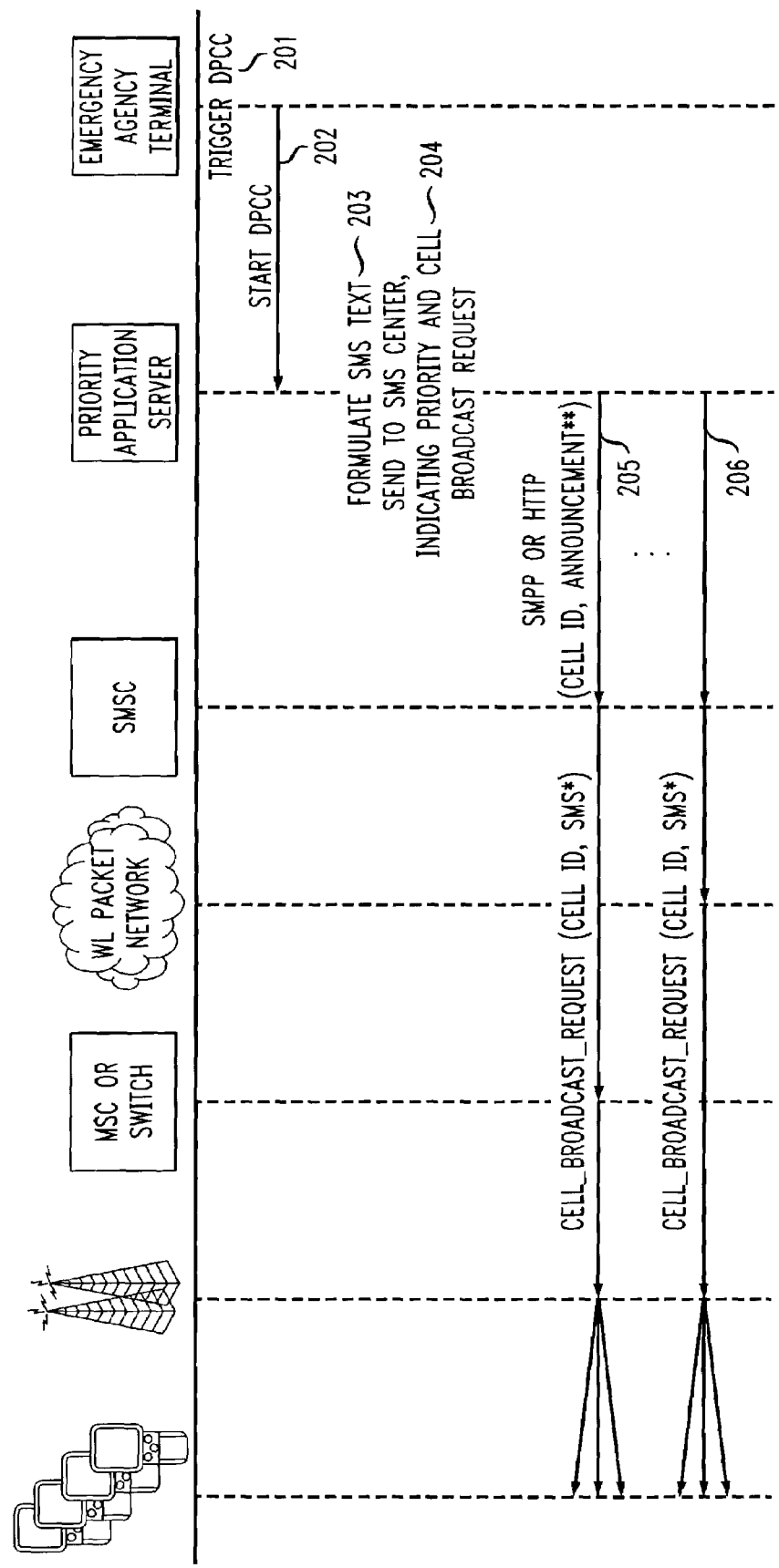

The priority communication system 100 includes a priority application server 100A, a priority code database 100B, at least one terminal device 100C and, optionally, an Instant Messaging Server 100D. There is also be a location database 100F to map the location of the emergency to cell sites that SMS cell broadcasts are to be delivered. If multiple SMS unicasts are to be used for notifying the emergency workers, a "close users group" (something similar to "bodylists" in instant message services) is stored so the recipients of the notifications can be determined. Also, a location based priority call code is stored in the location database 100F. Associated code processing software 100E, located in the Mobile Switching Centers 106D, is used to interface with the mobile subscriber stations 101, 102. FIGS. 2–5 illustrate in flow diagram form the operation of the present priority communication system. In FIG. 2, the flow of messages among the various elements illustrated in FIG. 1 is detailed for a scenario where the priority communication system 100 is activated and the various emergency service personnel are informed of the use of priority call access codes in their respective service areas as well as the priority call access code that is presently active.

The call priority process is typically initiated at step 201 by authorized emergency services agency personnel accessing a secure terminal, such as terminal 100C to initiate the priority communication process. The authorized emergency services agency personnel triggers the priority call access code distribution process at step 202 by accessing the priority application server 100A and using digital signatures to authenticate their identity and validate the request. The priority application server 100A formulates text messages at step 203 that identify the cell sites in the coverage area that is impacted by the present emergency and also provide a code word that identifies the existence of an emergency situation and, optionally, the nature of the emergency. These text messages are transmitted to relevant message centers at step 204, such as Short Message Service Centers 104 or Instant Messaging servers 100D, with the priority application server 100A indicating the priority associated with the delivery of these messages. In the case of Short Message Service Centers 104, cell broadcasts can be used to deliver the priority call access codes to emergency service personnel who are located in the impacted coverage areas. Using cell broadcast short message services, the cell sites are obtained based on the location-to-cell site mapping information stored in the priority communication system database. These Short Message Service Centers 104 deliver broadcast messages to each of the identified cell sites at steps 205, 206 using a wireless packet and/or circuit switched networks. Each cell site broadcasts It is a broadcast in the viewpoint of cell sites, from the viewpoint of the SMSC, it is a multicast because requests are only sent to a selected group of cell sites) the text messages to the mobile subscriber stations of the identified emergency service personnel who are located in the coverage area of that cell site (in cell broadcast case, the message reaches all devices in the coverage area of the cell site). If Instant Messaging is used, the Instant Messaging server 100D delivers the above-noted message which contains the URL of the priority application server 100A to all of the emergency service personnel who are in the emergency user bodylist in the coverage areas.

Figure 3:
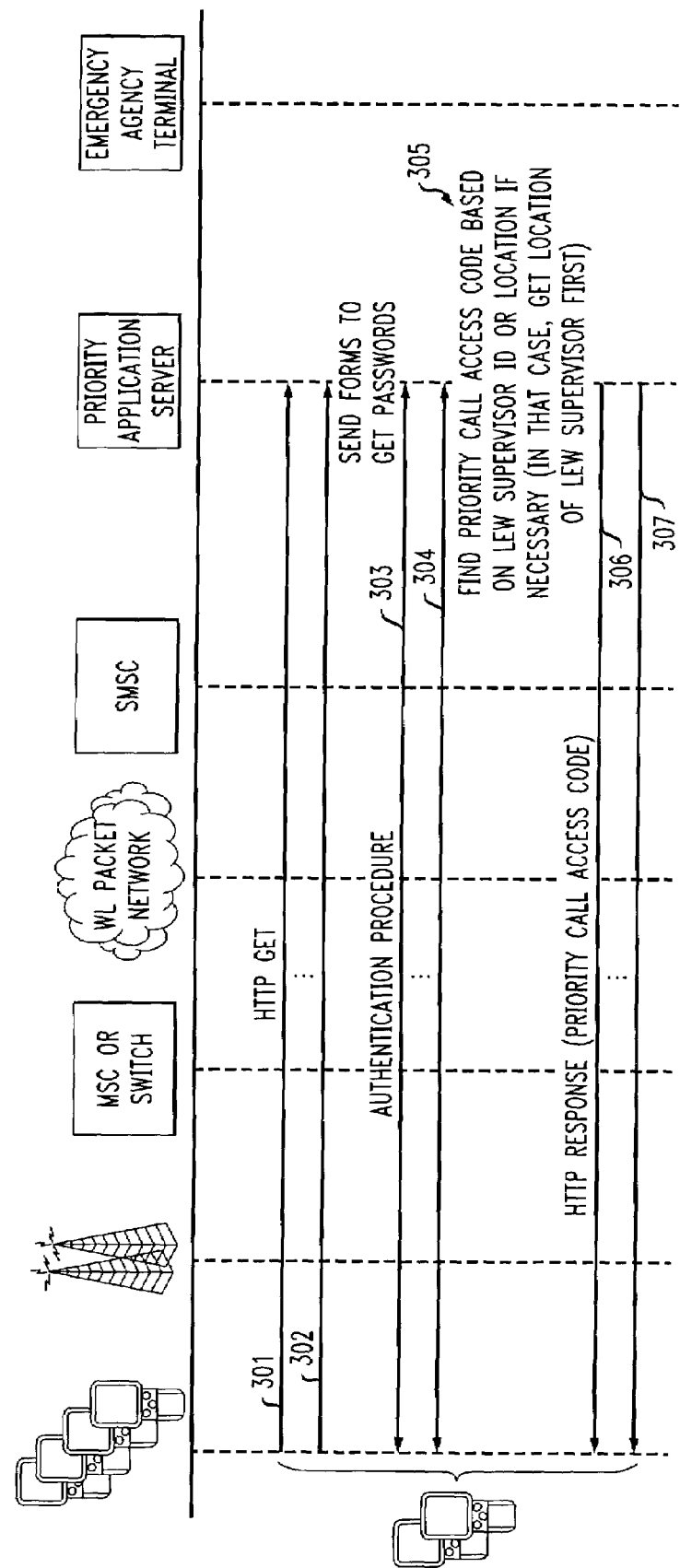

Upon receipt of the text message containing the emergency activation code word, the individual emergency service personnel must obtain the presently active priority call access code that is used in their present location. This process is illustrated in FIG. 3 where the World Wide Web is used to retrieve this data via the Instant Messaging service. In this process, at step 301, 302, individual emergency service supervisory personnel initiate an access of the priority application server 100A using the identified URL, i.e. using web access method with HTTP GET, for this site, as noted in the received text message. At steps 303–304, individual emergency service supervisory personnel are authenticated by the priority application server 100A to validate the identity of the individual emergency service personnel, via the use of screen displays transmitted to the emergency service personnel and response passwords received from the emergency service personnel, and to identify the present location (serving cell site or sites) of the emergency service personnel. The identity of the supervisor for the individual emergency service personnel can also be used to identify the assigned area of responsibility of the emergency service personnel and therefore the associated cell sites. In case the emergency service personnel does not know his/her current location, it is automatically determined by the wireless service provider. At step 305, the priority application server 100A accessed the database 100B of priority call access codes to determine the correspondence between the identified emergency service personnel, their present location and the priority call access code activated for this locale. At steps 306–307, the priority application server 100A returns a message to the emergency service personnel to indicate the priority call access code that is to be used for this emergency to obtain access to wireless communication facilities.

Figure 4:
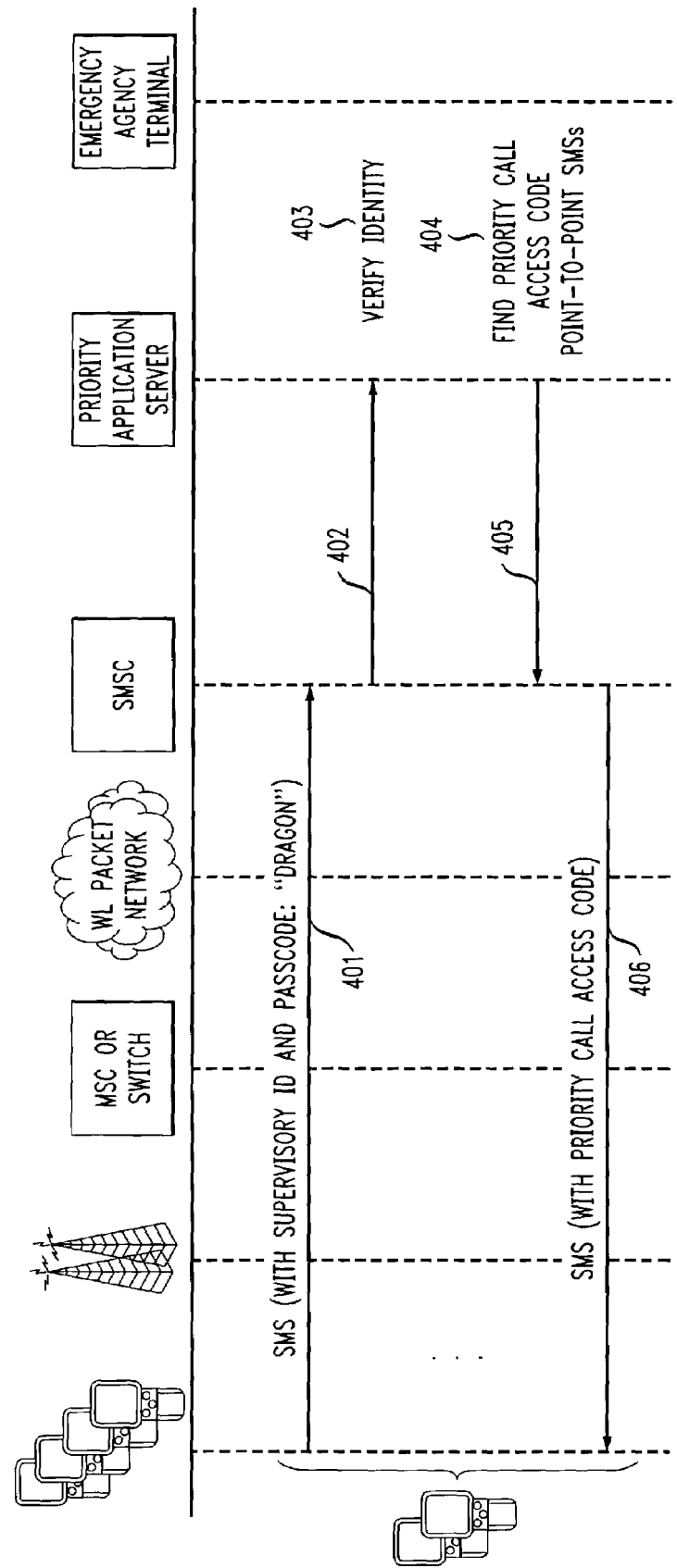

A similar process shown in FIG. 4 can be used to obtain the priority call access codes via the use of the Short Message Service feature. At step 401, the emergency service personnel use their mobile subscriber station 101 to transmit an SMS message to the Short Message Service Center 104, with data that identifies the emergency service personnel (e.g. user name) and a passcode, which typically comprises the above-noted code word that identifies the existence of an emergency situation to initiate the retrieval of the priority call access code. The Short Message Service Center 104 forwards the received SMS message to the identified destination, which is the priority application server 100A, at step 402. Since the mobile subscriber station 101 is automatically identified by the cellular communication system (this only identifies the phone number, but not the user name), priority application server 100A verifies the identity of the individual emergency service personnel at step 403 and at step 404 accesses the database 100B of priority call access codes to determine the correspondence between the identified emergency service personnel, their present location and the priority call access code activated for this locale. At step 405, the priority application server 100A returns an SMS message to the Short Message Service Center 104 for forwarding to the requesting emergency service personnel. At step 406, the Short Message Service Center 104 transmits this SMS message to the requesting emergency service personnel to indicate the priority call access code that is to be used for this emergency to obtain access to wireless communication facilities.

The delivery of the priority call access codes is accomplished on a hierarchical basis, with the emergency service personnel supervisors accessing the priority application server 100A in response to receipt of the code word. The priority application server 100A performs authentication and returns the priority call access codes based upon the user's identification and upon their location. This process is detailed above with respect to FIGS. 2–4. These emergency service personnel supervisors can then forward the retrieved priority call access codes to their subordinate emergency service personnel, as shown in FIG. 5. In particular, the emergency service personnel supervisors at steps 501–502 initiate individually directed SMS messages to their subordinates to identify the priority call access code. The SMS messages at steps 503–504 are routed to the identified emergency service personnel. All of the emergency service personnel who then have the priority call access codes can now originate wireless calls within the coverage area on a priority basis.

Activated Range of Operation of the System

The present priority communication system 100 provides the capability to restrict access to wireless communications services to a selected set of subscribers, such that their access to wireless communication services is not interruptible. This is accomplished by provisioning the cell site nodes 133, 134 of a wireless communications system into a plurality of service priority groupings, with wireless subscribers being assigned one of the plurality of service priorities, for example by the provision of service priority defining data in the Home Location Register 161 for the wireless subscribers. The wireless service provider can then differentially provide wireless communication services to the wireless subscribers, based upon the service priority assigned to a particular subscriber.

The priority communication system 100 is activated to provide guaranteed wireless communication service in a manner that is commensurate with the locale(s) that require such service. The emergency personnel make voice communications by first dialing the priority access code. The definition of the range of operation can be in geographic terms (such as county-wide), as provided to the wireless service provider by a responsible civil authority, which geographic terms are translated to an associated set of cell site nodes 133, 134 that provide wireless communications services in the corresponding geographic area. This translation can be a manual operation, but is preferably a pre-programmed translation that is contained within the priority communication system 100 to thereby expedite the activation of this system and reduce the possibility of error in activation.

In this system, the Mobile Switching Center 106D receives the identity of the mobile subscriber station 101 from the base station 133 pursuant to the wireless service request process noted above. The Mobile Switching Centers 106D compares the identity of the mobile subscriber station 101 and the received priority call access code with the service priority data stored in the code processing software 100E to determine whether this mobile subscriber station 101 is entitled to wireless service. If this determination indicates that the mobile subscriber station 101 should be denied service, call processing exits and the mobile subscriber station 101 is provided with a brief "no service available" message and the radio channels are deallocated. If service can be provided to the mobile subscriber station 101, the Mobile Switching Center 106D indicates the authorization of the mobile subscriber station 101 to receive priority access to wireless communication facilities via the entry of data into the data record for this mobile subscriber station in the Home Location Register 161 (or the Visitor Location Register 162). Calls without priority call access codes are treated normally after all priority calls have been processed. The communication connection is then extended from this transmitter-receiver pair of the base station 133 to another communications network, such as a common carrier public telephone network to complete the service request received from the mobile subscriber station 101. This second stage of the communication connection is set up in well-known fashion in the Mobile Switching Center 106D, which is connected to the common carrier public telephone network by incoming and outgoing trunks. The Mobile Switching Center 106D contains a switching network to switch mobile customer voice signals from the communication link to an incoming or outgoing trunk.

Call Handoff

When a mobile subscriber station 101 approaches the boundary of a cell, the radio signal received at the base station 133 is at a minimum level. Since the mobile subscriber station 101 is at the boundary of two cells, the signal power from the transmitter located in the adjacent cell is equal to or greater than the original cell and a handoff procedure is initiated. First, the cell base station 133 may initiate a mobile subscriber station location process in the adjoining cells. Alternatively, the serving base station 133 may utilize measurements from the mobile subscriber station 101 by processing the received pilot strength measurement message. This first procedure is accomplished either by activation or continuous operation of a locating receiver in each of the adjoining cells which tunes to the radio frequency and channel on which the mobile subscriber station 101 is transmitting. The measured signal strength of this signal, as received at each of the adjoining cells, is compared and the strongest signal is indicative at that base station 134 which is to receive the handoff. If there is an available voice channel in that cell, the mobile subscriber station 101 is sent a message on the control channel to re-tune its transmitter to the identified available voice channel at the transmitter frequency and orthogonal coding of the selected cell. Simultaneously, the voice connection is switched at the base stations 133, 134 from one cell to the next via the Mobile Switching Center 106D to provide uninterrupted service. In this handoff process, the availability of wireless communication services is determined by the Mobile Switching Centers 106D, using the above-defined service availability process and the priority service authorization data that is stored in the Home Location Register 161 for this mobile subscriber station.

Summary

The priority communication system provides the capability to restrict access to wireless communications services to a selected set of subscribers, such that their access to wireless communication services is not interruptible. The wireless subscribers who have been assigned a predetermined service priority are provided with access to wireless communication capacity in the wireless communication system to ensure their uninterrupted access to wireless communication services.

What is claimed is:

1. A system for providing guaranteed wireless communication service to predefined ones of wireless subscribers, operational in a wireless communication network that includes a plurality of radio network controllers, each of which manages the operation of at least one base station for wirelessly communicating with mobile subscriber stations located in the coverage area of said base stations, comprising:
   means for storing data indicative of at least one wireless subscriber service priority and a set of call access codes associated with said at least one wireless subscriber service priority;
   means for transmitting a priority call access code to predefined ones of wireless subscribers;
   means, responsive to receipt of a service request and a priority call access code from a wireless subscriber, for determining whether said priority call access code corresponds to a priority call access code stored in said set of call access codes; and
   means, responsive to a determination that said transmitted priority call access code corresponds to a priority call access code stored in said set of priority call access codes, for providing access to wireless communication facilities for use by said wireless subscriber.

2. The system of claim 1 further comprising:
   means for processing a call initiation request received from a wireless subscriber whose transmitted priority call access code fails to correspond to a priority call access code stored in said set of priority call access codes as normal call processing.

3. The system of claim 1 wherein said means for transmitting comprises:
   means for generating an emergency alert message that indicates the existence of an emergency situation and the identity of a plurality of subscribers; and
   means for broadcasting said emergency alert message to said plurality of subscribers.

4. The system of claim 3 wherein said means for transmitting further comprises:
   means, responsive to receipt of a query from a requesting one of said plurality of subscribers, for validating the identity of said requesting subscriber; and
   means, responsive to said identity being validated, for transmitting data to said requesting subscriber indicative of said priority call access code.

5. The system of claim 1 wherein said means for providing comprises:
   means, responsive to said requesting wireless subscriber generating a call handoff request, for determining whether the call is a priority call; and
   means, responsive to a determination that said call is a priority call, for serving said call handoff request received from said requesting wireless subscriber.

6. The system of claim 5 wherein said means for providing comprises:
   means, responsive to a determination that said call is not a priority call, for treating said call handoff request received from said requesting wireless subscriber.

7. A method for providing guaranteed wireless communication service to predefined ones of wireless subscribers, operational in a wireless communication network that includes a plurality of radio network controllers, each of which manages the operation of at least one base station for wirelessly communicating with mobile subscriber stations located in the coverage area of said base stations, comprising:
   storing data indicative of at least one wireless subscriber service priority and a set of call access codes associated with said at least one wireless subscriber service priority;
   transmitting a priority call access code to predefined ones of wireless subscribers;
   determining, in response to receipt of a service request and a priority call access code from a wireless subscriber, whether said priority call access code corresponds to a priority call access code stored in said set of call access codes; and
   providing, in response to a determination that said transmitted priority call access code corresponds to a priority call access code stored in said set of priority call access codes, access to wireless communication facilities for use by said wireless subscriber.

8. The method of claim 7 further comprising:
   processing a call initiation request received from a wireless subscriber whose transmitted priority call access code fails to correspond to a priority call access code stored in said set of priority call access codes as normal call processing.

9. The method of claim 7 wherein said step of transmitting comprises:
   generating an emergency alert message that indicates the existence of an emergency situation and the identity of a plurality of subscribers; and
   broadcasting said emergency alert message to said plurality of subscribers.

10. The method of claim 9 wherein said step of transmitting further comprises:

validating, in response to receipt of a query from a requesting one of said plurality of subscribers, the identity of said requesting subscriber; and transmitting, in response to said identity being validated, data to said requesting subscriber indicative of said priority call access code.

11. The method of claim 7 wherein said step of providing comprises: modify to indicate determination of an existing call to be priority call for priority handoff treatment. Handoffs are an automated process, the subscribers will not enter an authorized priority call access code;

determining, in response to said requesting wireless subscriber generating a call handoff request, whether the call is a priority call; and serving, in response to a determination that said call is a priority call, said call handoff request received from said requesting wireless subscriber.

12. The method of claim 11 wherein said step of providing comprises:

treating, in response to a determination that said call is not a priority call, said call handoff request received from said requesting wireless subscriber.

13. A system for providing guaranteed wireless communication service to predefined ones of wireless subscribers, operational in a wireless communication network that includes a plurality of radio network controllers, each of which manages the operation of at least one base station for wirelessly communicating with mobile subscriber stations located in the coverage area of said base stations, comprising:

means for generating an emergency alert message that indicates the existence of an emergency situation and data indicative of the identity of a plurality of subscribers;

means for broadcasting said emergency alert message to said plurality of subscribers;

means, responsive to receipt of a query from a requesting one of said plurality of subscribers, for validating the identity of said requesting subscriber;

means, responsive to said identity being validated, for transmitting data to said requesting subscriber indicative of a priority call access code;

means, responsive to receipt of a service request and a priority call access code from said requesting subscriber, for determining whether said priority call access code corresponds to a valid priority call access code; and means, responsive to a determination that said transmitted priority call access code corresponds to a valid priority call access code, for providing access to wireless communication facilities for use by said requesting wireless subscriber.

14. The system of claim 13 further comprising:

means for processing a call initiation request received from a wireless subscriber whose transmitted priority call access code fails to correspond to a priority call access code stored in said set of priority call access codes as normal call processing.

15. A method for providing guaranteed wireless communication service to predefined ones of wireless subscribers, operational in a wireless communication network that includes a plurality of radio network controllers, each of which manages the operation of at least one base station for wirelessly communicating with mobile subscriber stations located in the coverage area of said base stations, comprising:

generating an emergency alert message that indicates the existence of an emergency situation and data indicative of the identity of a plurality of subscribers;

broadcasting said emergency alert message to said plurality of subscribers;

validating, in response to receipt of a query from a requesting one of said plurality of subscribers, the identity of said requesting subscriber;

transmitting, in response to said identity being validated, data to said requesting subscriber indicative of a priority call access code;

determining, in responsive to receipt of a service request and a priority call access code from a wireless subscriber, whether said priority call access code corresponds to a valid priority call access code; and providing, in response to a determination that said transmitted priority call access code corresponds to a valid priority call access code, access to wireless communication facilities for use by said wireless subscriber.

16. The method of claim 15 further comprising:

processing a call initiation request received from a wireless subscriber whose transmitted priority call access code fails to correspond to a priority call access code stored in said set of priority call access codes as normal call processing.

* * * * *